United States Patent [19]
Van Andel

[11] 3,801,908
[45] Apr. 2, 1974

[54] CURRENT MEASURING APPARATUS EMPLOYING MAGNETIC SWITCH

[75] Inventor: Eleonoor Van Andel, Twekkelo, Netherlands

[73] Assignee: Akzo N.V., Arnhem, Netherlands

[22] Filed: Mar. 9, 1972

[21] Appl. No.: 233,189

[30] Foreign Application Priority Data
Mar. 16, 1971 Netherlands..................... 7103542

[52] U.S. Cl.......... 324/117 R, 324/43 R, 324/99 R, 324/127
[51] Int. Cl....................... G01r 33/00, G01r 33/02
[58] Field of Search............ 324/127, 117 R, 117 H, 324/99 D, 43 R, 34 RS, 98, 99 R

[56] References Cited
UNITED STATES PATENTS
3,500,109  3/1970  Sugiyama et al................... 324/99 D
3,518,544  6/1970  Tachick.............................. 324/127

*Primary Examiner*—Alfred E. Smith
*Assistant Examiner*—Ernest F. Karlsen
*Attorney, Agent, or Firm*—Stevens, Davis, Miller & Mosher

[57] ABSTRACT

Current measuring apparatus for determining the strength of the current in an electric conductor. The apparatus comprises an actuating coil, a magnetic switch positioned within the composite magnetic field produced by the currents flowing through the conductor and the actuating coil, generating means coupled to the actuating coil for providing an increasing exciting current or an increasing step-wise voltage thereto, and measuring apparatus coupled to the magnetic switch for determining the instant at which the switch changes from one state to the other under the influence of the composite magnetic field. The current through the actuating coil at the instant that the switch changes states corresponds to the magnitude of the current through the electric conductor. The apparatus may be used in conjunction with the operation of electrolytic cells having large numbers of anodes wherein it is useful to know the current flowing through each anode.

9 Claims, 4 Drawing Figures

PATENTED APR 2 1974    3,801,908

CURRENT MEASURING APPARATUS EMPLOYING MAGNETIC SWITCH

BACKGROUND OF THE INVENTION

The invention relates to a current-measuring apparatus for determining the strength of current in one or more electric conductors by means of a magnetic switch positioned near said conductors.

A known current-measuring apparatus of the above-mentioned type comprises a number of reed switches which are positioned at various distances from the conductor and whose contacts are closed under the influence of the magnetic field prevailing around the conductor. According to the distance between the conductor and the reed switch, each of the reed switches responds to a particular current strength. The moment the contacts of a reed switch are closed, a corresponding lamp will light up. The higher the current strength, the larger the number of lamps that will light up, and conversely. The known current-measuring apparatus permits only a rough measurement of the current strength $I$. If, for instance, it comprises three reed switches which respond to some strength of current in the conductor of $I_1, I_2$, and $I_3$ amp., then it is only possible to indicate in which of the four following ranges the current strength $I$ lies:

1. $I < I_1$
2. $I_1 \leq I < I_2$
3. $I_2 \leq I < I_3$
4. $I \geq I_3$

It will be clear that this type of measurement is very inaccurate. Its inaccuracy can only be reduced by providing a large number of reed switches placed relative to the conductor at radial distances which must differ only little. In that case, however, a large number of reed switches are required which presents difficulties particularly if a large number of conductors are present. This is the case for example in the electrolysis of NaCl. In an electrolytic plant there are present a large number of electrolytic cells, each consisting of a long-shaped trough having a somewhat inclining bottom over which there is a flow of mercury. The mercury is covered with brine. The cell is closed at its top by a lid through which there project a number of anodes which extend downwards to just above the level of the mercury. Upon the passage of current from the anodes to the mercury cathode, the NaCl decomposes into sodium and chlorine which are liberated at the cathode and the anode, respectively. The sodium unites with part of the mercury to form sodium amalgam, which in a caustic soda cell connnected to the electrolytic cell reacts with water to form sodium hydroxide and hydrogen. The mercury thus recovered may be fed back to the electrolytic cell.

In order to ensure proper operation, the anodes should be correctly spaced in relation to the mercury cathode. If the distance is too small, there is the risk of a short circuit taking place, which may be disastrous, especially if use is made of metal anodes. Moreover, a loss of production may be caused by the chlorine re-uniting with the sodium from the sodium amalgam to form NaCl. On the other hand, too large a distance leads to an increased voltage drop between anode and cathode, which with the high current strengths that are used leads to a considerable increase in electric energy consumption.

Monitoring the electrolysis process by frequent measurement of the distance between the anodes and the cathode is difficult to realize because the electrolytic cell is entirely closed off. Besides, the anodes and the cathode are not continuously equidistant since both the mercury surface and the opposed surface of the underside of the anodes are usually uneven. For process monitoring, it is therefore preferred to measur the cell current, and more particularly to measure the current through each anode separately, because the distribution of cell current may be highly non-uniform among the anodes.

It is known that the anode current may be determined from the drop of potential measured between two points on the anode current conductor. As this voltage is only a few mV, it is difficult to measure at a distance. Another solution, in which each anode is provided with a millivolt meter which is read in situ, is both expensive and impractical because in an electrolytic plant of some size, thousands of anodes are present. The present invention provides a current measurement apparatus of the type indicated in the opening paragraph, which apparatus is particularly, although not exclusively, suitable for the measurement at a distance of the current strength in a large number of conductors.

SUMMARY OF THE INVENTION

The invention comprises current measuring apparatus including an actuating coil cooperating with a magnetic switch, an electric current source which is connected to the actuating coil and serves to supply an exciting current varying with time, and a measuring apparatus for determining the strength of the current in the actuating coil at the moment the switch changes its switching state under the influence of the combined magnetic action of the current in the conductor and the current in the actuating coil.

A magnetic switch, as defined herein, is an element which under the influence of a magnetic field has two different electric states.

In this current-measuring apparatus, an external magnetic field is produced by the current in the conductor and forms a composite field together with the internal magnetic field produced by the actuating coil. When the strength of this composite field has reached a particular threshold value, the magnetic switch is brought into its other state. As this threshold value is reproducible, the strength of the current in the actuating coil at the moment the switching state is changed is also a measure of the strength of the external magnetic field and, hence, of the strength of the current in the conductor.

A conceivable magnetic switch may comprise a ring core placed on the conductor and provided with two windings, the core consisting of a magnetic material with a rectangular hysteresis loop. One of the windings serves as an actuating coil and the other as a detection coil. When there is no flow of current through the actuating coil, the core will be saturated. Upon the passage through the actuating coil of current of increasing strength in a direction such that the field strength in the core decreases, the magnetic flux in the core will at a given moment reverse in direction. This reversal induces a voltage pulse in the detection coil. The current strength prevailing in the exciting coil at the moment the voltage pulse is induced may serve as a measure of the strength of the current in the conductor.

However, it is preferred to use a current-measuring device which is characterized in that the magnetic switch is formed by a reed relay provided with an actuating coil.

The reed relay consists of a pair of magnetic reeds sealed into a length of glass tubing filled with an inert gas. By applying a magnetic field parallel to the tubing, the reeds will be moved into contact with each other and close the current circuit connected to the reed relay. The reed relay is an inexpensive and reliable device. It may be so positioned relative to the conductor that it does not close until the strength of the magnetic field produced around the conductor has been increased to a given value by the field of the actuating coil.

It is preferred to place the reed relay in such a position, relative to the direction of the current in the conductor, that it remains closed while under the influence of the field of the current-carrying conductor only. This is because the opening of the reed relay can be reproduced better than the closing.

In this connection, it is recommended that the current source supplies an increasing current. The current source is so connected that the direction of the magnetic field produced by the current-carrying actuating coil is opposite to that of the field produced by the current-carrying conductor and the exciting current is increased until the magnetic switch changes its state to open the reed relay. At that moment, the magnetic field of the actuating coil has compensated the field of the conductor.

The strength of the current in the actuating coil at which the magnetic switch passes from the one switching state into the other, may be varied by applying pre-magnetization with the aid of a third magnetic field. This may be the field of a permanent magnet or electromagnet or that of a separately fed, additional actuating coil.

In principle, the exciting current may be increased as some function of time, provided that at any moment the current strength is accurately known. If the current-measuring apparatus serves to determine the strength of the currrent in only one or a few conductors, then a suitable solution would be to provide a supply source which furnishes a current that increases linearly with time. The measuring sensitivity will then be independent of the strength of the exciting current and the measurement of the current strength can be reduced to a simple time measurement with the aid of a counter. This counter is started at the same time as the current supply source and stopped at the moment the magnetic switch changes its state.

The invention also relates to an electric distribution system consisting of a number of current conductors for feeding electrical equipment, more particularly an electrolytic cell, which distribution system is provided with a current-measuring apparatus of the aforedescribed type. This distribution system is characterized in that at least part of the current conductors are provided with a magnetic switch with an actuating coil cooperating therewith, the actuating coils are connected to a common electric source, and the magnetic switches are connected to a common measuring apparatus.

The common current source may be successively connected to the various actuating coils, after which at each actuating coil the current strength is determined at which the corresponding magnetic switch is opened. A simpler arrangement is to connect the actuating coils in series with the common current source, all coils then carrying the same current.

However, it is preferred to connect the actuating coils in parallel so that the same voltage is applied to all coils. Surprisingly, a determination of the voltage at which the magnetic switches change their switching state results in a more accurate measurement of the strength of the current in the conductor than obtained by a determination of the exciting current. This is apparently due to some variation in the numbers of windings of the various actuating coils. As the compensation of the field around the conductor not only depends on the exciting current but also on the number of windings of the respective actuating coil, a measuring error may occur if this number differs from the expected number.

A preferred embodiment of the electric distribution system with the actuating coils connected in parallel is characterized in that the current supply source furnishes a voltage which increases stepwise. This embodiment is particularly suitable in cases where the distribution system comprises a large number of conductors for which the current strengths have to be determined. In such a case, the simultaneous measurement of all current strengths may be objectionable. It would be better then for the switching conditions of the magnetic switches to be "read" in rapid succession. In the case of a stepwise increase in the feed voltage a certain time is available between two successive voltage steps for deciding which switches have changed their switching state as a result of the preceding step. This may be done separately for each switch; but the positions of the relays also may be "read" groupwise i.e., in such a way that of each group of relays the information about the switching state becomes simultaneously available for all relays of the group.

If the voltage after the $i$th voltage step is $E_i$ and after the subsequent $(i+1)$ the step is $E_i + 1$ and a magnetic switch changes its switching state after the $i$th step, the corresponding voltage $E_c$ of its actuating coil is determined by the relationship $$E_i < E_c \leqq E_{i+1}, \text{ or } E_i < E_c \leqq E_i + (\Delta E)_i \qquad (1).$$

where $(\Delta E)_i$ is the voltage change at the $i$th step.

Therefore, the measuring apparatus has for its task to decide after each step which switch (or switches) has changed its switching state. The current strength of the corresponding conductor is then derived from (1).

The accuracy with which $E_c$ is determined may be influenced by the step magnitude $\Delta E$. The voltage steps need not all be of the same magnitude. In some cases it is preferred that the magnitude of the voltage steps should be variable. This applies particularly in those cases where the current strengths in the conductors are on the whole within a relatively limited measuring range. In that case it is recommended that within this range smaller voltage steps are used than outside this range.

The invention also relates to an electric distribution system for feeding one or more electrolytic cells which are each provided with at least two electrodes. It is characterized in that on at least one current conductor connected to an electrode there is provided a magnetic switch.

Reed relays are already known to be used on electrolytic cells for the purpose of preventing a short circuit. In that case a reed relay is provided on the busbar for carrying the current to an anode sub-group consisting of, for instance, five anodes. The reed relay is so positioned on the busbar that in normal operation it is open, but as soon as the total current for the anode sub-group exceeds a certain value it is closed. The respective anode sub-group is then lifted and removed from the cathode. In order that afterwards the anodes may again be placed at the correct distance from the cathode, the current in the busbar is measured by determining the drop of potential between two points of the busbar. Therefore, in this known apparatus the reed relays do not serve to measure the anode current but merely to detect an imminent short-circuit.

Further, the invention relates to an electric distribution system for feeding one or more electrolytic cells which are each provided with a number of anodes and one common cathode, more particularly for feeding an electrolytic cell with a mercury cathode. This system is characterized in that on each current conductor connected to an anode there is provided a magnetic switch.

DESCRIPTION OF THE PREFERRED EMBODIMENTS

Figure 1:
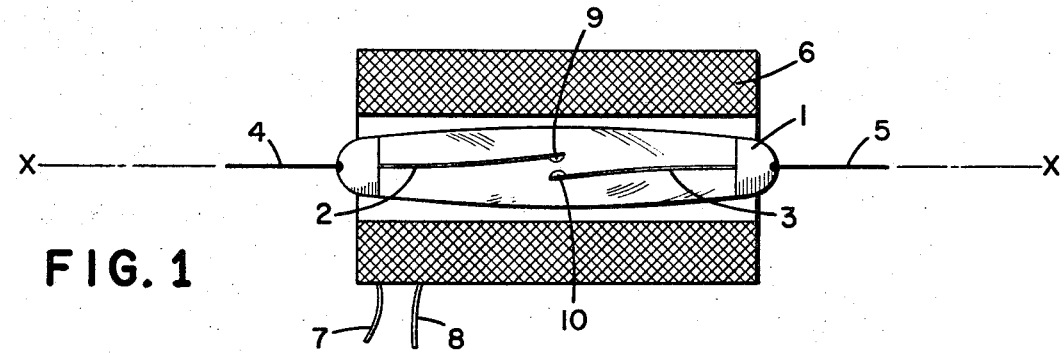
FIG. 1 is a cross-sectional view of a reed relay.

In FIG. 1, the numeral 1 refers to a glass tube of a reed relay filled with inert gas. Into the tube 1, which has a longitudinal axis $x-x$, are sealed two magnetic reeds 2, 3 whose projecting ends 4 and 5 serve as electrical connections. Around the tube 1 there is wound an actuating coil 6 to which current may be fed via connections 7, 8. When there is a flow of current through the coil an internal magnetic field may be produced which magnetizes the reeds 2, 3. When a certain current strength is exceeded, the reed ends 9, 10 are moved into contact with each other and the reed relay is closed. When subsequently the exciting current decreases, the contact is again opened.

If the reed relay is provided on or near a current-carrying conductor, i.e., with its longitudinal axis $x-x$ transverse to the direction of flow of the current, then the reed relay also may be closed under the influence of the field around the conductor. If, in such a situation, current of increasing strength is fed to the actuating coil, then the reed relay will at a given moment open again when the direction of the magnetic field is opposite to that of the conductor.

Figure 2:
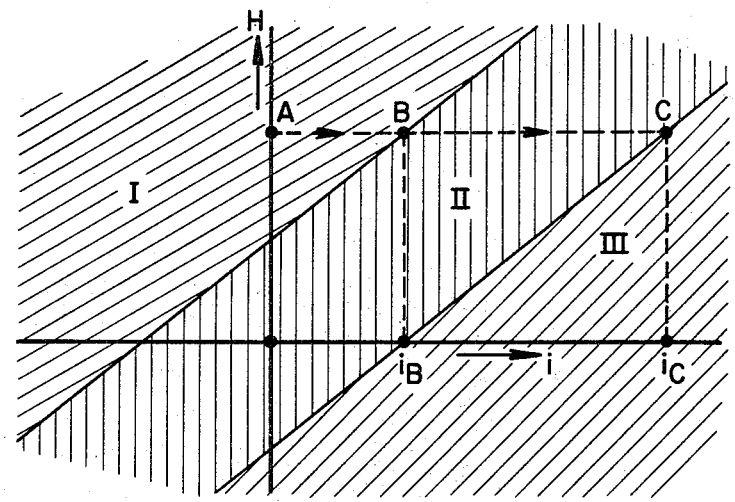
FIG. 2 is a graph showing the operation of the reed relay.

FIG. 2 shows the behavior of the reed relay under the combined influence of the field produced by the current-carrying actuating coil and an oppositely directed "external" field of different origin. On the abscissa is plotted the current strength $i$ in the actuating coil, on the ordinate the magnetic field strength H of the external field. Let the initial exciting current $i = 0$, the strength of the external field $H_A$ at which the reed relay is closed being indicated by the point A. When the exciting current increases, the point ($H_A$, $i$) will move along a straight line parallel to the abscissa. At a current strength $i_B$, the reed relay (point B) opens. Then the field of the actuating coil compensates the external field. Upon a further increase in current, the reed relay remains open until the current strength has reached the value $i_C$ (point C). The field of the actuating coil will then sufficiently dominate the external field to cause the reed relay to close again.

So three areas may be distinguished, which are shown differently hatched in FIG. 2. In the areas I and III the reed relay is closed; in the area II it is open. The dividing line between the areas I and II is indicative of a unique relation between the strength H of the external magnetic field and the current strength $i$ in the actuating coil required for the compensation of this field. Thus, from the compensating current strength $I_c$ in the actuating coil the current strength in the conductor can be derived. The value $I_c$ may be determined with the aid of a measuring apparatus.

The figure does not show the influence of contact hysteresis. But the latter does not affect the measurement provided that the operation graph of FIG. 2 is always followed in the same direction.

Around the conductor whose current is to be measured, there may be provided a U-shaped iron circuit between the ends of which the reed relay is placed. The lines of force in the magnetic field of the current-carrying conductor run via this iron circuit and the reed relay placed between the end thereof. This construction may be of importance for measuring direct current of relatively low strength. For relatively high current strengths there is no need for this provision since a reed relay closes at a distance of about 1 meter from a conductor carrying a current of 1,000 amps. Moreover, without the use of an iron circuit a better linear relation is obtained between exciting current and current to be measured.

In order to avoid interference from disturbing fields, various reed relays may be arranged symmetrically around the conductor. The mean value of the exciting currents required to open the reed relays may be taken as a measure of the current strength to be determined.

Figure 3:
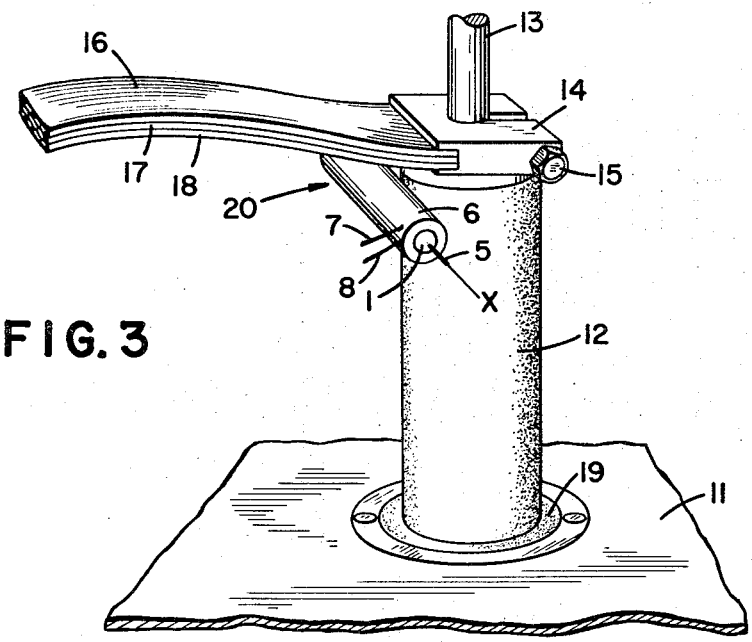
FIG. 3 represents an anode connection of an electrolytic cell provided with a reed relay.

An embodiment in which the above-described measuring principle is applied to an electrolytic cell is partly shown in FIG. 3.

In this figure the numeral 11 refers to a part of a lid of a cell for the electrolysis of NaCl. In the cell are a number of graphite anodes whose undersides are near a flowing mercury cathode. On the mercury is brine. Direct current is fed to the anodes via an electric distribution system, which consists of current conductors that are connected to anode bars, one of which is shown in FIG. 3, which are attached to the anodes. This anode bar consists of a graphite sleeve 12 fitting on a copper pin 13. A terminal 14 is attached to the pin 13 by means of a bolt 15. Attached to the terminal 14 are a number of strip-shaped conductors 16, 17 and 18, which by a suitable connector (not shown) are connected to a busbar. The construction comprising the conductors 16, 17 amd 18, the terminal 14, and the copper pin 13 with graphite sleeve 12 can be bodily moved up or down for the adjustment of anode-cathode distance. A seal 19 serves to prevent chlorine from escaping via the anode passage through the lid 11.

Underneath the conductors 16, 17 and 18, a reed relay 20 is positioned against the sleeve at right angles thereto. As described with reference to FIG. 1, this reed relay comprises an actuating coil 6 with a glass tube 1 containing two contact reeds. One of the contact reed connections is visible in the drawing and referred to by 5. The connections of the coil 6 are indicated by 7 and 8.

On each anode bar of the electrolytic cell and also on each anode bar of any other electrolytic cell, if present, there is provided a reed relay. All of these reed relays are connected in parallel with a common electric current source which is present in a control room. The supply source furnishes a step-wise increasing voltage to the actuating coils. The magnitude of the steps is not constant. As soon as the exciting voltage has reached a value which falls within a range which corresponds to the "operating range" of the anodes, the magnitude of the step is reduced. By "operating range" of the anodes is to be understood here, the range of the current strength within which lie most of the anode current strengths. By increasing the voltage applied to the actuating coils the reed relays will be opened. In order to determine the anode current strengths a measuring apparatus, which is also present in the control room, need only determine at what exciting voltages the various reed relays were opened. The measuring apparatus may serve for all reed relays. It may read the switching positions of the reed relays one by one or groupwise. In the latter case the reed relays are combined into groups, the measuring apparatus simultaneously reading the switching positions of the reed relays belonging to a particular group.

Figure 4:
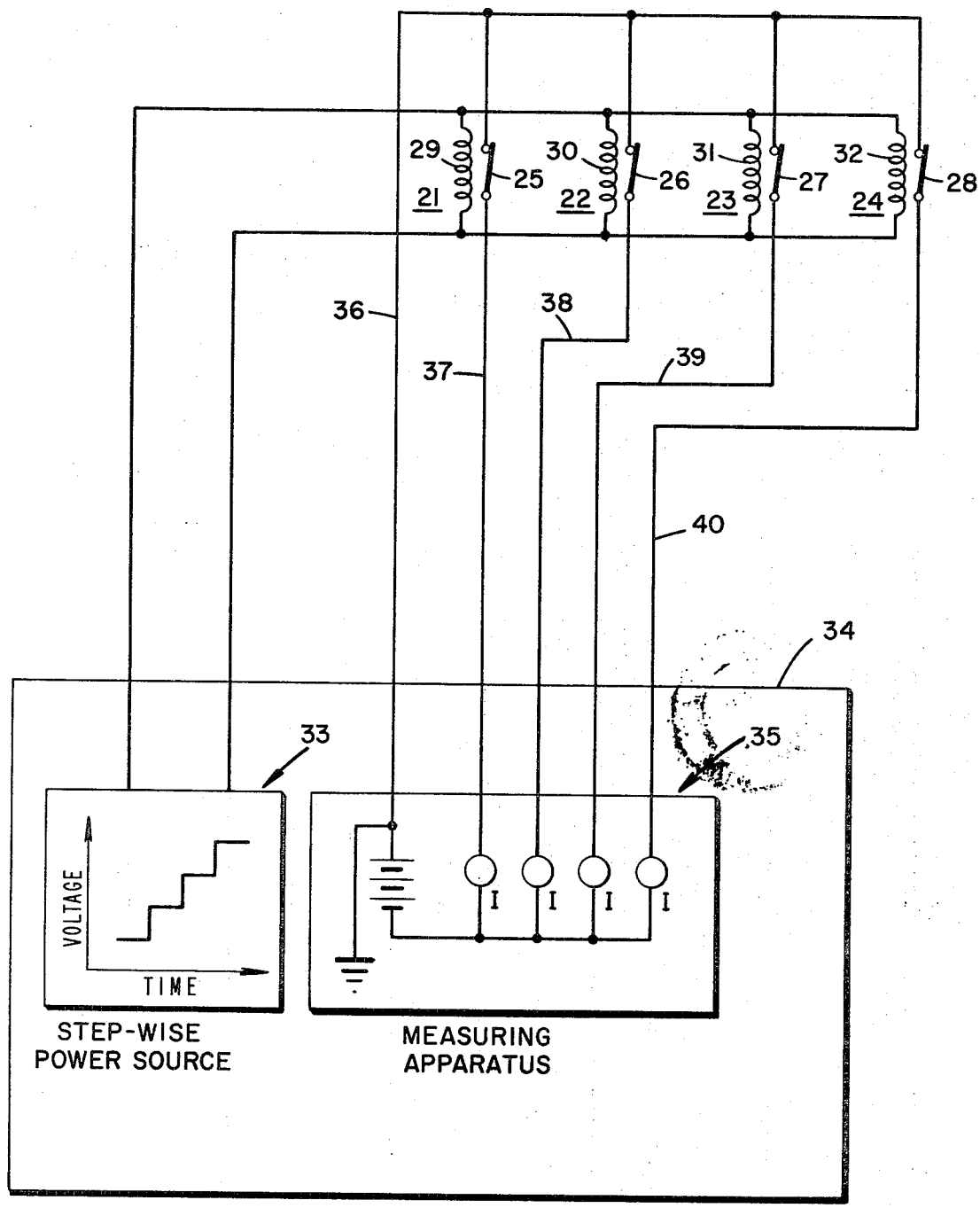
FIG. 4 schematically shows a circuit diagram with four reed relays.

For only four reed relays 21-24 the situation is schematically shown in the circuit diagram of FIG. 4. These relays comprise the magnetic reed contacts 25-28 and the exciting coils 29-32. The coils 29-32 are connected in parallel to a common electric current source 33 in a control room 34. The voltage supplied by the current source 33 increases stepwise. Also present in the control room is a measuring apparatus 35 to which the reed contacts 25-28 are connected by means of wires 36-40. Wire 36 is connected to all four relay contacts and is at ground potential. As soon as the voltage across one of the relay coils, say 30, has increased to such a value that the corresponding relay contact 26 opens, connecting wire 38 is no longer at ground potential, whereby the opening of relay contact 26 is indicated on indicators I. Thereupon the output voltage of current source 33 is determined and serves as a measure of the current strength in the anode to which reed relay 22 is attached.

It is of importance that the information which is to be supplied from the anodes to the control room is only of a binary nature: contact closed or open. In this way the transfer of signals may be considerably simplified. If the switching state of the reed relays between two successive voltage steps is sensed in rapid succession, then for n electrodes the use of a cable consisting of 2 $\log_2 n$ wires will suffice. For 6,400 anodes, for example, this implies that the cable running from the reed relays may consist of 26 wires.

If desired, the current strength may in the above-described way be measured in the main conductors from which the anode current conductors branch off.

Of course, the entire measurement and the processing of the measuring data may be automated. To this end the increasing of the exciting votage, the "reading" of the reed relays, and the registration of the exciting voltages at which they are opened may be controlled from a central point.

The entire measuring and registration procedure may be carried out in cycles of fixed duration or automatically be restarted as soon as the preceding cycle is completed. Moreover, it is, of course, possible for the adjustment of the distance of the anodes to the cathode on the basis of the measurements of the strength of the anode current to be effected manually or automatically. The above procedures may with advantage be carried out under the control of a digital process computer, particularly if they are to be carried out in an alectrolytic plant with a large number of cells.

Although in the foregoing description mention is made of a common electric current supply source and a common measuring apparatus, this does not mean to imply that all reed relays must cooperate simultaneously with the current supply source and the measuring apparatus. It is also possible for the supply source and the measuring apparatus to be connected cell by cell to the reed relays provided thereon.

The above-described measurement of current strength has the great advantage that the actual current pickup, i.e., the reed relay, is a very reliable and inexpensive element. It is therefore possible to provide each anode with a separate pickup without this leading to a prohibitively costly apparatus. Thus at each cell the anode currents and consequently also the distribution of current among the various anodes may be observed; moreover, protection from short-circuiting may be obtained, which is of particular importance if use is made of costly titanium anodes. Besides, the binary character of the pickup considerably simplifies data processing. It is of further advantage that the measuring circuit is electrically isolated from the electrolytic cell.

What is claimed is:

1. Current measuring apparatus for determining the strength of the current in at least one electric conductor comprising
   a. at least one actuating coil for producing a magnetic field corresponding to an exciting current therethrough,
   b. at least one magnetic switch having a pair of switching states positioned within the composite magnetic field produced by the currents flowing through said conductor and said actuating coil respectively,
   c. generating means coupled to said actuating coil for providing an exciting current thereto which varies with time, and
   d. measuring apparatus coupled to said magnetic switch for determining the instant at which said switch changes from one state to the other under the influence of the combined magnetic action of the currents in said conductor and said actuating coil, the current in said actuating coil at said instant corresponding to the current through said electric conductor.

2. Current-measuring apparatus according to claim 1 wherein said actuating coil and said magnetic switch comprise a reed relay.

3. Current-measuring apparatus according to claim 1 wherein said generating means provides an increasing actuating current.

4. An electric distribution system having a plurality of current conductors for feeding at least one electrolytic cell comprising
   a. a plurality of actuating coils for producing a magnetic field corresponding to an exciting current therethrough,
   b. a plurality of magnetic switches, each having a pair of switching states and each positioned within the magnetic field produced by the current flowing through a corresponding conductor and the magnetic field produced by a corresponding actuator coil,
   c. generating means coupled to said actuating coils for providing exciting currents therein which vary with time, and
   d. measuring apparatus coupled to each of said magnetic switches for determining the instant at which said switch changes from one state to the other under the influence of the combined magnetic action of the currents in said corresponding conductor and corresponding actuator coil, the current through said actuating coil at said instant corresponding to the current through said electric conductor.

5. An electric distribution system according to claim 4 wherein said actuating coils are connected in parallel.

6. An electric distribution system according to claim 5 wherein said generating means provides a voltage which increases stepwise.

7. An electric distribution system according to claim 6 wherein the magnitude of said voltage steps is variable.

8. An electric distribution system according to claim 2 wherein said reed relay is mounted adjacent said conductor with its longitudinal axis transverse to the direction of current flow in said conductor.

9. The method of measuring current in a conductor comprising the steps of
   a. placing a switch responsive to a magnetic field and having a pair of switching states within a first magnetic field produced by the current flowing through said conductor,
   b. generating a second magnetic field which surrounds said switch, said first and second magnetic fields forming a composite magnetic field,
   c. increasing the strength of said second magnetic field until said switch changes from one state to the other under the influence of said composite magnetic field, and
   d. measuring the strength of said second magnetic field at the instant said switch changes from one state to the other, the strength of said second magnetic field at this instant corresponding to the magnitude of the current in said conductor.

* * * * *